Patented May 4, 1943

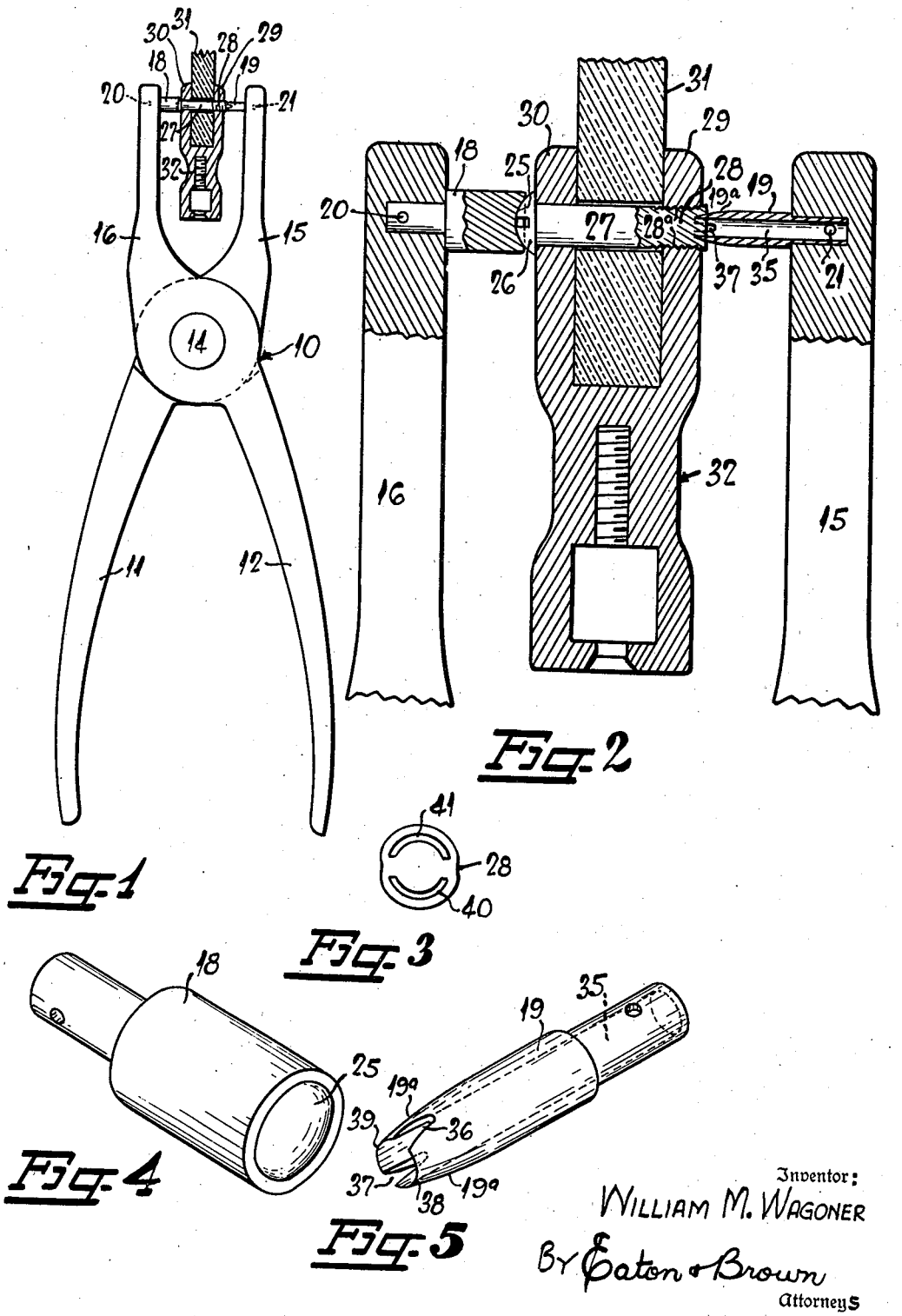

2,318,270

UNITED STATES PATENT OFFICE 2,318,270

OPTOMETRIST TOOL

William M. Wagoner, Newton, N. C.

Application November 8, 1941, Serial No. 418,349

1 Claim. (Cl. 81—3.6)

This invention relates to a tool used by optometrists for securing the threaded ends of small screws in their respective bores. The invention is particularly useful where it is desired to permanently secure a screw in position without having the end thereof projecting beyond the bore.

For example, it is general practice to secure the lens of each pair of eye glasses to nose and ear pieces by means of suitable screws. Usually the nose piece has a pair of spaced legs between which each lens is inserted and then an attaching screw penetrates the legs and lens to secure the parts together. One of the lug legs has a tapped hole therein for threadably receiving the smaller end of the screw. A similar connection often is used for attaching the ear pieces. If the threaded ends of the screws are not securely fixed in position within the bores, the screws will frequently work loose, thereby permitting the lens to become detached from the mounting.

It is an object of this invention to provide a special tool capable of swelling the outer periphery of the threaded end portion of an inserted screw without disturbing the material in the central portion, thus locking the screw in position within its bore. By swelling or expanding only the outer periphery a locking effect can be obtained with a minimum of pressure on the end of the screw. Also the screw may be locked without having any portion of the threaded end projecting beyond the bore, and without having any rough places in the periphery of the end of the screw.

Some of the objects of the invention having been stated, other objects will appear as the description proceeds, when taken in connection with the accompanying drawing, in which—

Figure 1 is a view showing my improved tool in a position for expanding the threaded end of a screw while in a bore;

Figure 2 is an enlarged detail view with certain portions thereof shown in section, illustrating the operation of the tool;

Figure 3 is an end view of the screw after the same has been expanded;

Figure 4 is an isometric view of an abutment member carried by one of the jaws of the tool, said abutment member being adapted to engage the head of a screw while the other end is being expanded;

Figure 5 is an isometric view of a mandrel, which is adapted to be carried by the other jaw of the tool, for expanding the threaded end of the screw.

Referring more particularly to the drawing, the numeral 10 broadly designates my improved tool which in many respects resembles an ordinary pair of pliers. This tool comprises handle members 11 and 12 pivoted to each other as at 14. The handles 11 and 12 have integral therewith suitable jaws 15 and 16, and in the ends of these jaws are secured abutment member 18 and mandrel 19 by any suitable means such as screws 20 and 21, respectively.

The abutment member 18 preferably has a socket 25 in one end thereof for engaging the head portion 26 of a screw or rivet 27. This screw or rivet has a threaded end 28 for threadably engaging a bore 28a in a lug member 29, said lug member cooperating with another spaced lug member 30 in holding a suitable lens 31 therebetween. These members 29 and 30 form an integral part of a fitting 32, which, in turn, is adapted to be secured to a nose bridge of a pair of spectacles in a conventional manner.

The mandrel 19 has a cylindrical bore 35 therein extending throughout its length. The wall of bore 35 (Figure 5) merges with an inwardly tapered outer periphery 19a of the mandrel thereby providing an arcuate knife edge lying in the same plane as the cylindrical wall surface. In other words, the inner wall surface adjacent the knife edge is substantially parallel to the longitudinal center line of the mandrel, whereas the outer wall surface is tapered outwardly. In the present embodiment of the invention, a pair of notches 36 and 37 are provided, thus dividing the knife edge into two spaced arcuate cutting edges 38 and 39.

The diameter of the circle in which the knife edges 38 and 39 lie is smaller than the diameter of the threaded end 28. Therefore, when the screw 27 is placed in the position shown in Figures 1 and 2, and pressure is applied, the two knife edges 38 and 39 will cut into the end 28 of the screw or rivet and thereby form two arcuate trenches or notches 40 and 41, respectively. It will be noted that these notches are disposed on each side of the center of the screw end. Since the inner wall of the bore 35 is substantially parallel with the axis center line of the screw, and since the outer wall 19a is tapered outwardly from the cutting edge, the material disposed between the two notches 40 and 41 will not be disturbed, but the material on the outside of the notches will be expanded to cause the threads on the screw 27 to tightly fit into the screw threads in member 29. By using this improved tool only a thin layer of the material will have to be swelled in order to provide the necessary releasably locking of the end 28 within its bore.

Although the tool is shown in connection with a threaded screw end and a threaded bore, it is evident that it could be used to swell the smooth end of a rivet within a smooth bore, without departing from the spirit of the invention.

In the drawing and specification, there has been set forth a preferred embodiment of the invention and although specific terms are employed, they are used in a generic and descriptive sense only and not for purposes of limitation, the scope of the invention being set forth in the following claim.

I claim:

An optometrist tool for expanding the threaded end of a screw threaded bolt into the threads in a bore in a spectacle frame in which a forked portion of the frame fits over an edge of a lens with one portion of the fork having a smooth hole therethrough and the other portion of the fork having a threaded hole therethrough for threadably receiving the threaded end of the bolt, said tool comprising a pair of relatively movable jaws, a socket carried by one of the jaws for engaging the head of the bolt, a mandrel carried by the other jaw for engaging the threaded end of the bolt, said mandrel having a cylindrical bore therein, the wall of the bore extending in a straight line and intersecting an inclined outer periphery of the mandrel to provide a beveled cutting edge at the outer end of the mandrel, whereby when the jaws are moved towards each other the inclined outer periphery of the mandrel will spread the threaded end of the bolt outwardly against the threads in the threaded portion of the spectacle frame and will expand the end of the bolt, to a greater diameter than the threaded hole in the frame.

WILLIAM M. WAGONER.